United States Patent [19]
Fraysse et al.

[11] Patent Number: 5,184,950
[45] Date of Patent: Feb. 9, 1993

[54] PROCESS AND DEVICES FOR THE DECONTAMINATION OF SOLID PRODUCTS

[75] Inventors: Guy Fraysse, Amberieu en Bugey; Jacques Thauront, Ermont, both of France

[73] Assignee: PEC Engineering, Paris, France

[21] Appl. No.: 597,711

[22] Filed: Oct. 12, 1990

[30] Foreign Application Priority Data

Oct. 12, 1989 [FR] France ................... 89 13364

[51] Int. Cl.$^5$ ............................................. F27B 14/00
[52] U.S. Cl. .......................................... 432/13; 432/59; 432/205; 110/246
[58] Field of Search ............... 110/246, 255; 432/205, 432/59, 13

[56] References Cited

U.S. PATENT DOCUMENTS

| | | | |
|---|---|---|---|
| 3,025,044 | 3/1962 | Giler | 432/205 |
| 4,086,050 | 4/1978 | Luiten et al. | 432/205 |
| 4,430,055 | 2/1984 | Sugiyama | 432/205 |
| 4,490,111 | 12/1984 | Yakura | 432/205 |
| 4,715,965 | 12/1987 | Sigerson et al. | 210/800 |
| 4,938,689 | 7/1990 | Macocco et al. | 432/59 |

FOREIGN PATENT DOCUMENTS

| | | |
|---|---|---|
| 0324566 | 7/1989 | European Pat. Off. |
| 0334570 | 9/1989 | European Pat. Off. |
| 3706684 | 10/1987 | Fed. Rep. of Germany |
| 3738704 | 5/1989 | Fed. Rep. of Germany |
| 61-263587 | 11/1986 | Japan |

*Primary Examiner*—Henry C. Yuen
*Attorney, Agent, or Firm*—Keck, Machin & Cate

[57] ABSTRACT

A process for the decontamination of a solid product polluted by a contaminant which can be vaporized by heating under vacuum, and devices for carrying out such a process, wherein the product is introduced into a heating and evacuating enclosure (3, 37, 72), said product is heated, substantially in bulk, within a given temperature range, a vacuum being created in said enclosure which is sufficient to reduce the pressure of the enclosure below the vaporization threshold of the contaminant within said temperature range, said temperature and reduced pressure conditions in the enclosure are maintained for a sufficient time to vaporize substantially all the contaminant contained in said product, the vaporized contaminant is extracted by sucking the atmosphere out of the enclosure, and said contaminant which has been sucked out is condensed.

20 Claims, 8 Drawing Sheets

PROCESS AND DEVICES FOR THE DECONTAMINATION OF SOLID PRODUCTS

The present invention relates to a process and devices for the decontamination of solid products polluted by one or more contaminants which can be vaporized by heating under vacuum.

It has a particularly important application in the area of the decontamination of products polluted by contaminants which are either directly hazardous to the environment, such as, for example, mercury, or indirectly hazardous due to their ability to degrade into by-products which themselves are directly hazardous to the environment.

This latter category of contaminants includes halogenated hydrocarbons, for example polychlorobiphenyls (PCBs), whose products of thermal degradation by oxidation are particularly hazardous.

The invention is especially applicable to the decontamination of soils or materials contaminated with mercury.

It also applies advantageously to the decontamination and the recovery or regeneration of soils contaminated with PCB, solvents or hydrocarbons, and to the decontamination and the recovery of transformers which have contained PCB—also known by the name "pyralene"—as the dielectric fluid, or else of rolls of aluminum foil used as the bodies of capacitors which have contained such a dielectric fluid.

It is known that, under certain temperature conditions and in the presence of oxygen, PCB can produce chlorinated benzoparadioxins or "dioxins", some of which are very highly toxic, especially 2,3,7,8-tetrachlorodi-benzoparadioxin (TCDD) (SEVEZO (sic) dioxin). The effective decontamination of products contaminated with PCB is therefore desirable.

Furthermore, the presence of a large amount of such polluted products makes it financially attractive to recover or regenerate them where possible.

It is known that there are essentially three types of treatment for a solid product contaminated with a certain proportion of contaminant.

The polluted product can be discarded in supervised dumps, it can be incinerated or, lastly, it can be decontaminated.

Dumping is a cumbersome and rather unsatisfactory solution.

Destruction by combustion must generally be carried out at very high temperature and is not applicable to every product. It is an expensive process, especially when the contaminated product does not have a high calorific value and therefore requires the addition of fuel with a high calorific value.

Finally, the known solutions to decontamination are generally expensive and complicated to carry out.

For example, processes are known for the decontamination of a transformer which has contained "pyralene", where the contaminated parts are washed with a solvent. Such a solution is unsuitable for the decontamination of friable solids, for example, and generates large volumes of liquid effluents.

Processes are also known for the decontamination of polluted soil, for example, by heating and evaporation of the contaminant in a rotary furnace in which the soil is mixed to permit homogeneous heating. This solution is unsuitable for the decontamination of unground bulky materials.

The aim of the present invention is to provide a process and devices for the decontamination of products polluted by one or more contaminants which can be vaporized by heating under vacuum, said process and devices satisfying practical requirements better than those known in the prior art, especially in that they make it possible to decontaminate all types of products—friable or non-friable, in pieces obtained by crushing or in a solid block which has not been crushed or ground, and contaminated with small or large proportions of one or more contaminants and to do this inexpensively and with excellent decontamination results which are better than those obtained industrially with the known processes.

It will therefore be possible for the contaminated products which have been treated according to the present invention to be recovered or even recycled as such.

For example, it is possible to recover the metals from a transformer contaminated with pyralene, or even to recycle the transformer after reassembly.

In the case of rolls of aluminum foil comprising paper contaminated with pyralene, the process of the invention has the advantage of enabling the aluminum and the paper to be separated easily.

To meet these objectives, the invention proposes especially a process for the decontamination of a solid product polluted by at least one contaminant which can be vaporized by heating under vacuum, wherein the product is introduced into a heating and evacuating enclosure, said product is heated, substantially in bulk, within a given temperature range, a vacuum being created in said enclosure which is below about 0.5 bar absolute and sufficient to reduce the pressure of said enclosure below the vaporization threshold of the contaminant (or sublimation threshold in the case of certain contaminants) within said temperature range, said temperature and pressure conditions in the enclosure are maintained for a sufficient time to vaporize (or sublime) substantially all the contaminant contained in said product, the vaporized contaminant is extracted by sucking the atmosphere out of the enclosure, and said contaminant which has been sucked out is condensed.

Unexpectedly, the process of the invention permits excellent desorption of the contaminant extracted from the polluted product, despite the fact that the initial contamination may be very small (a few ppm of contaminant only).

In advantageous embodiments, one and/or other of the following provisions can also be utilized:

the process is a discontinuous industrial process;
the vacuum created is below 0.3 bar absolute;
the vacuum created is below 0.1 bar absolute;
the vacuum created is below 0.05 bar absolute;
the vacuum created is between 0.5 bar absolute and 0.01 bar absolute and advantageously approximately equal to 0.1 bar absolute;
if the product is friable or in fragments or has been crushed or ground beforehand, the product is heated by being mixed in a rotary furnace;
the water vapor initially contained in the product and formed when said product is heated is extracted through a first circuit, said water vapor being condensed in a condenser/dust separator until it has been removed, then a vacuum is created in the enclosure under the conditions indicated above, and the vaporized contaminant is extracted by sucking the dehydrated atmosphere out of said enclosure through a second circuit, which is isolated from said first circuit;

if the product is non-friable, said product is heated by the circulation of a heating gas in the enclosure;

if the vaporizable contaminant is a contaminant whose thermal degradation is hazardous to the environment, the given temperature range is adjusted so as to avoid any overheating of the enclosure (locally or otherwise) to a temperature greater than or equal to the possible thermal degradation threshold of said contaminant;

if the vaporizable contaminant is PCB, the product is heated within a temperature range from about 200° C. to about 490° C., and advantageously from 270° C. to 330° C., the enclosure and the contaminated product being kept at temperatures which are always strictly below 500° C.;

in the case of a product of the friable type, in fragments or crushed beforehand, which is polluted with a contaminant whose by-products of thermal degradation by oxidation are hazardous to the environment, this being the case of PCB in particular, the operating vacuum is preferably created before the temperature is raised (after vaporization of the water), which makes it possible to remove the greater part of the oxygen present in the enclosure;

in the case of a non-friable product of the above type, heating by the circulation of a gas is advantageously carried out with an inert gas, such as nitrogen, after evacuation of the air from the enclosure;

if the vaporizable contaminant is especially mercury, the given temperature range is adjusted so as to limit the temperature of the extracted vaporized contaminant below a threshold value (for example a maximum of 800° C.);

the temperature and pressure conditions are maintained for a period of between about 5 hours and about 36 hours, and advantageously of about 8 hours;

if the vaporizable contaminant is mercury, the product is heated within a temperature range from about 200° C. to about 500° C., and advantageously at about 400° C.;

the vacuum created in the enclosure is between about 0.5 bar absolute and about 0.01 bar absolute, for example 0.08 bar;

in addition, the interior of the enclosure is swept at least once with an inert gas, advantageously nitrogen, when the vaporized contaminant is extracted, in order to entrain any residual traces of vaporized contaminant stagnating in said enclosure.

The invention also proposes a device for the decontamination of a friable solid product polluted by small proportions of a contaminant which can be vaporized by heating under vacuum, characterized in that it comprises:

an enclosure, means of heating the enclosure and its contents within a given temperature range which does not cause environmentally detrimental degradation of said contaminant, means of controlling the temperature of said enclosure, which are adjusted so as always to keep said temperature strictly below a given preset value, means of extracting the atmosphere from said enclosure and of placing it under a vacuum below about 0.5 bar absolute, and advantageously below about 0.1 bar absolute, which are capable of vaporizing said contaminant within said temperature range, and,—means of condensing the vaporized contaminant which has been sucked out.

The invention also proposes a device for the decontamination of a solid product polluted by at least one contaminant which can be vaporized by heating under vacuum, characterized in that it comprises:

a heating enclosure, means of heating the contents of the enclosure within a given temperature range, means of extracting the atmosphere from said enclosure and of placing it under a vacuum below about 0.5 bar absolute, which is capable of vaporizing said contaminant within said temperature range, means of controlling the temperature of the atmosphere extracted from said enclosure, which are adjusted r as always to keep said temperature strictly below a given preset value, and means of condensing the vaporized contaminant which has been sucked out.

The invention will be understood more clearly from the following description of particular embodiments, which are given by way of non-limiting examples.

The description refers to the accompanying drawings, in which.

Figure 3:
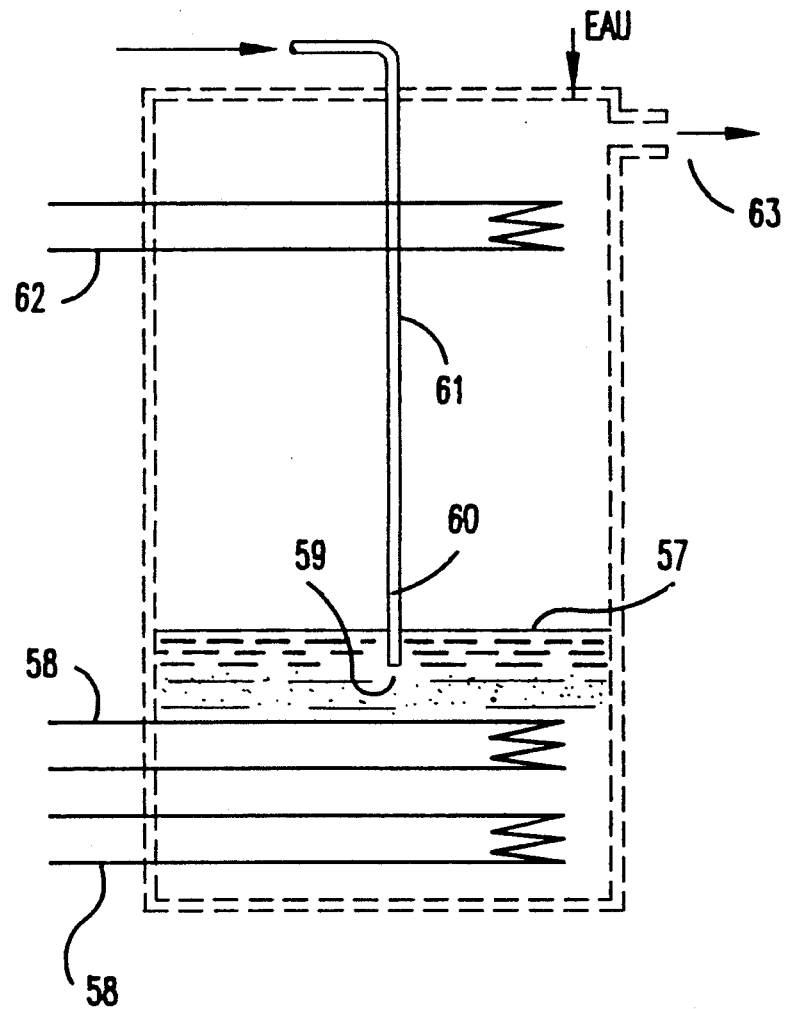

FIG. 3 schematically shows a capacitor (sic) filtering the water vapor by "bubbling", according to one embodiment of a device of the invention.

Figure 4:
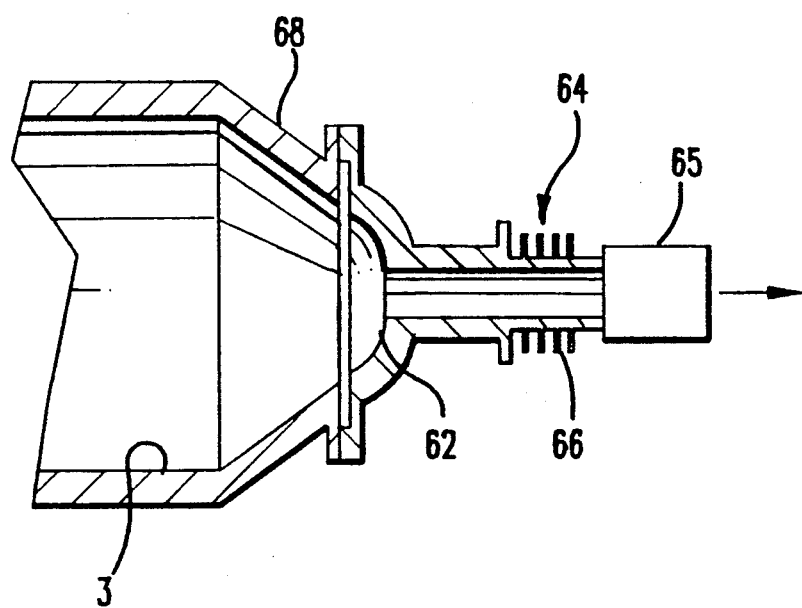
Figure 5:
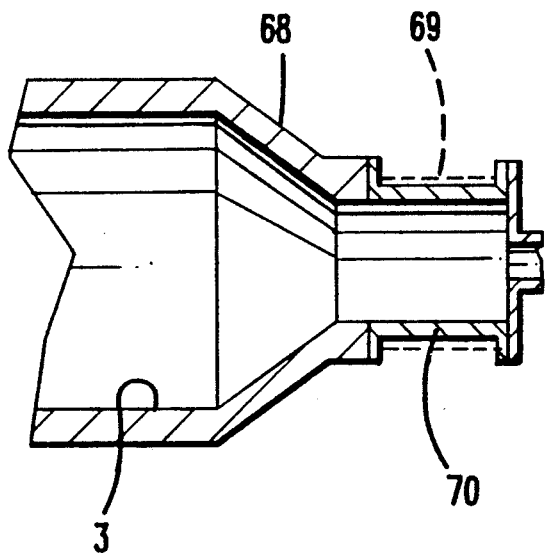

FIGS. 4 and 5 schematically show embodiments of the "rotating" joint between the rotary furnace and the extracting and condensing means of a device according to the invention.

Figure 6:
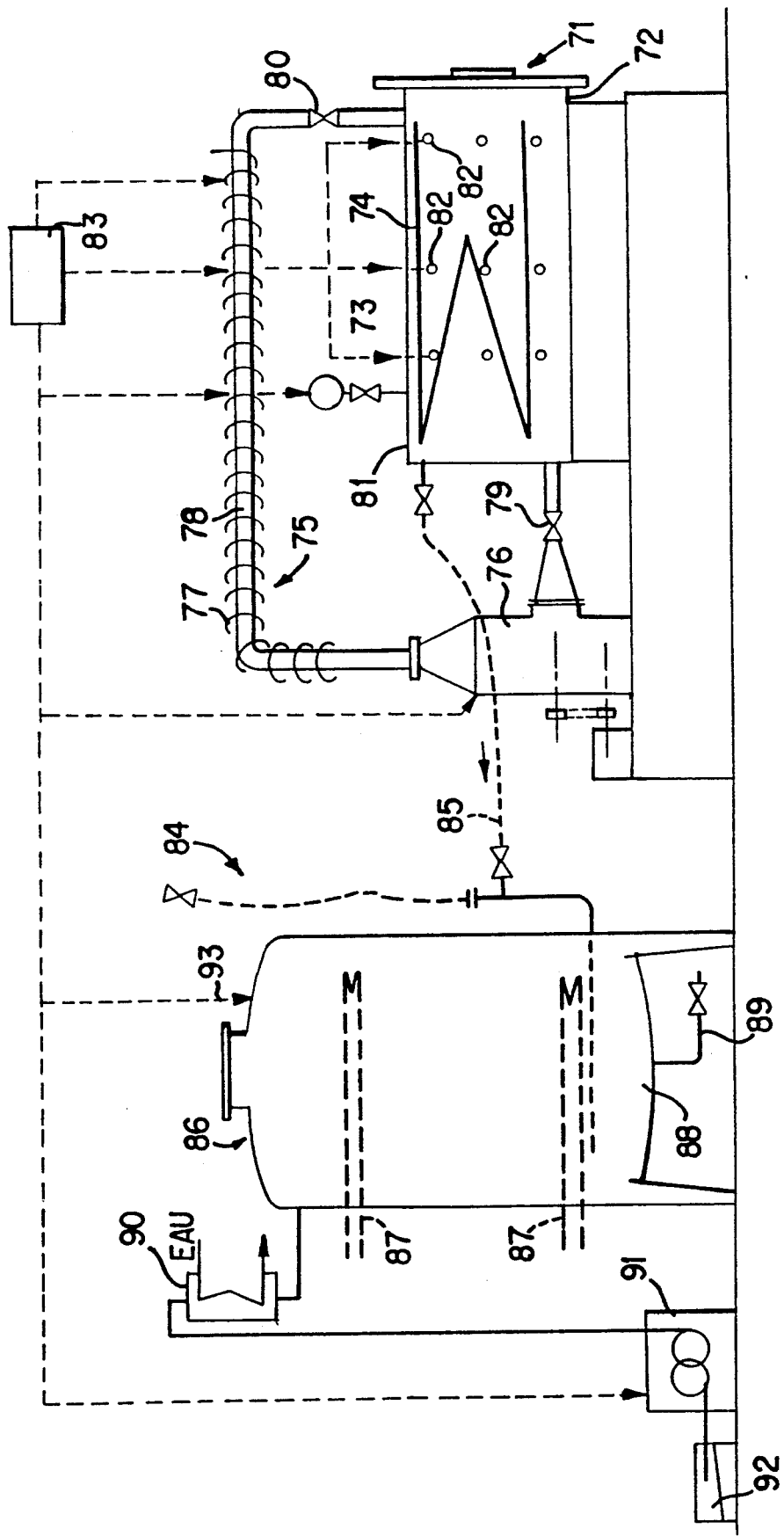

FIG. 6 is a skeleton diagram of one embodiment of the device according to the invention for carrying out the process according to the invention when applied to the decontamination of a non-friable solid product.

Figure 7:
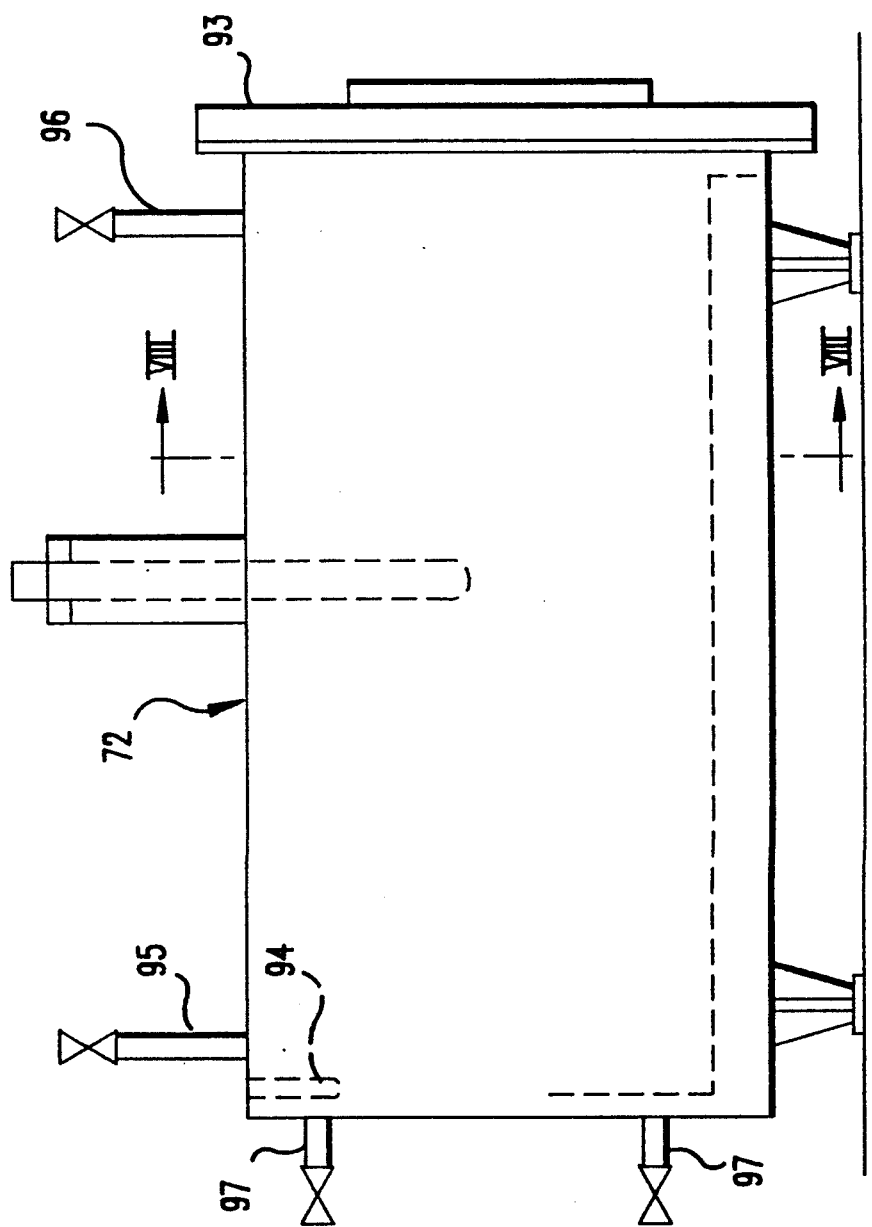

FIG. 7 is a side view in elevation of the heating enclosure of FIG. 6.

Figure 8:
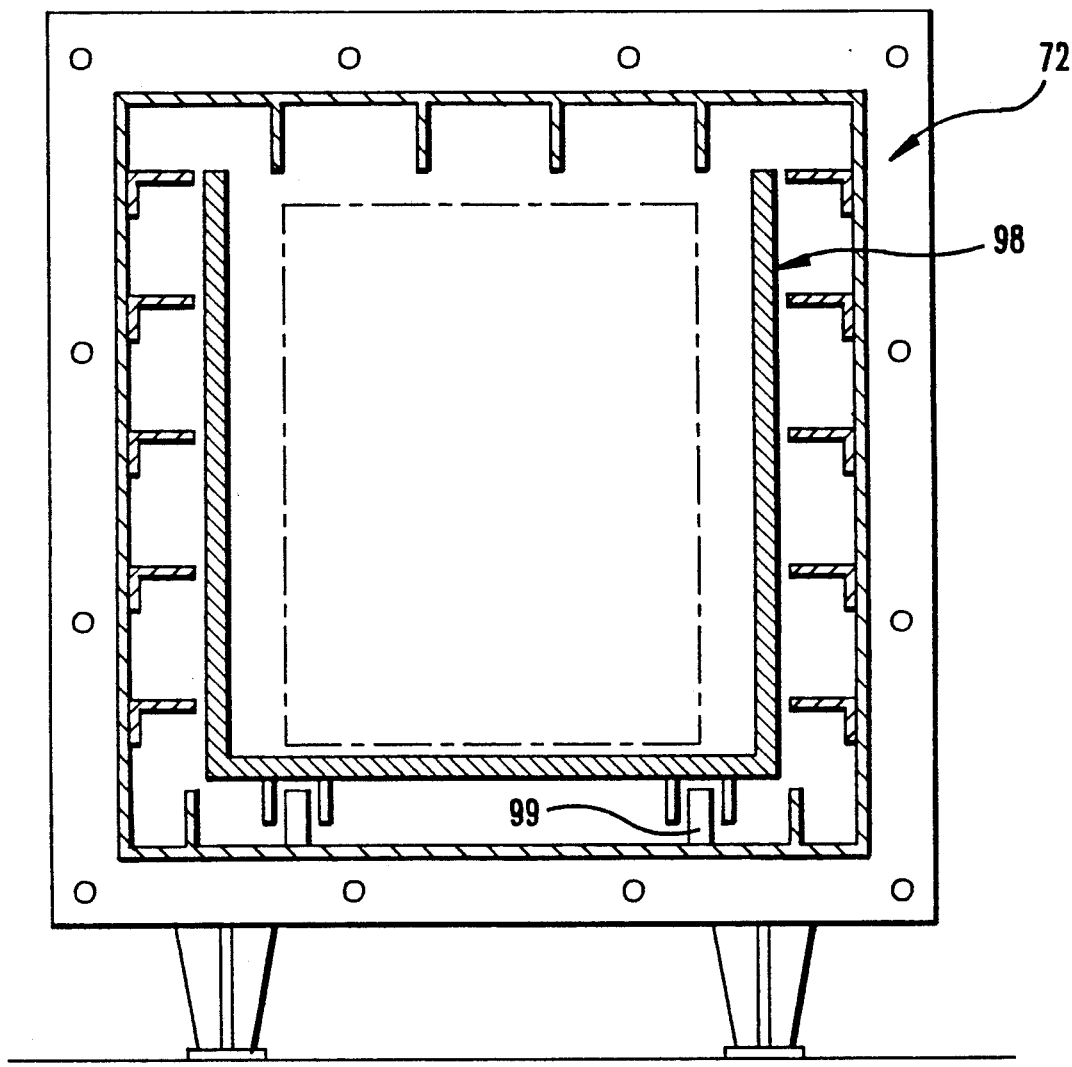

FIG. 8 is a section along the line VIII—VIII of FIG. 7.

Figure 2:
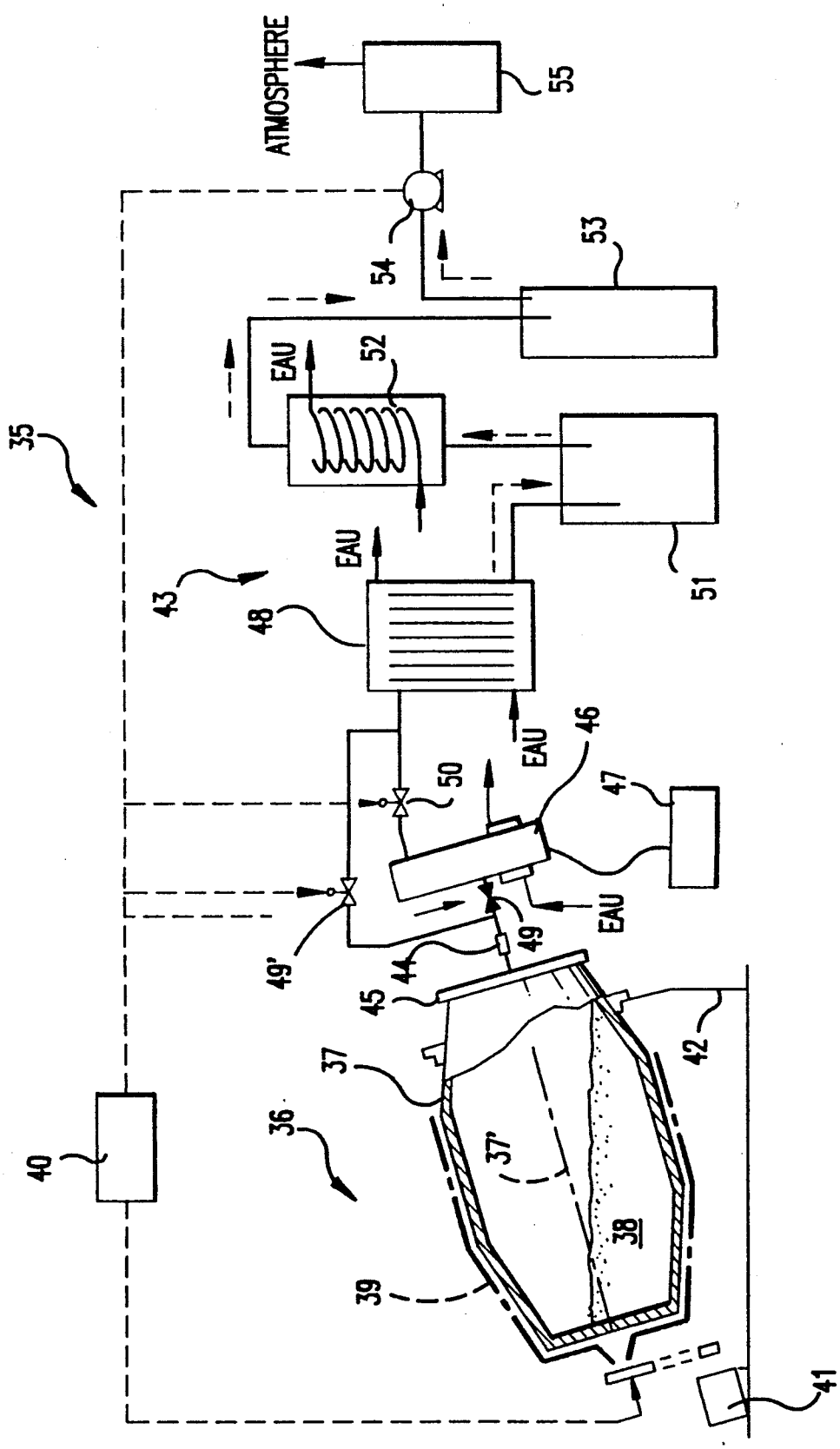
FIG. 2 is a skeleton diagram of another embodiment of the device according to the invention when applied to the decontamination of friable solid products.
Figure 9:
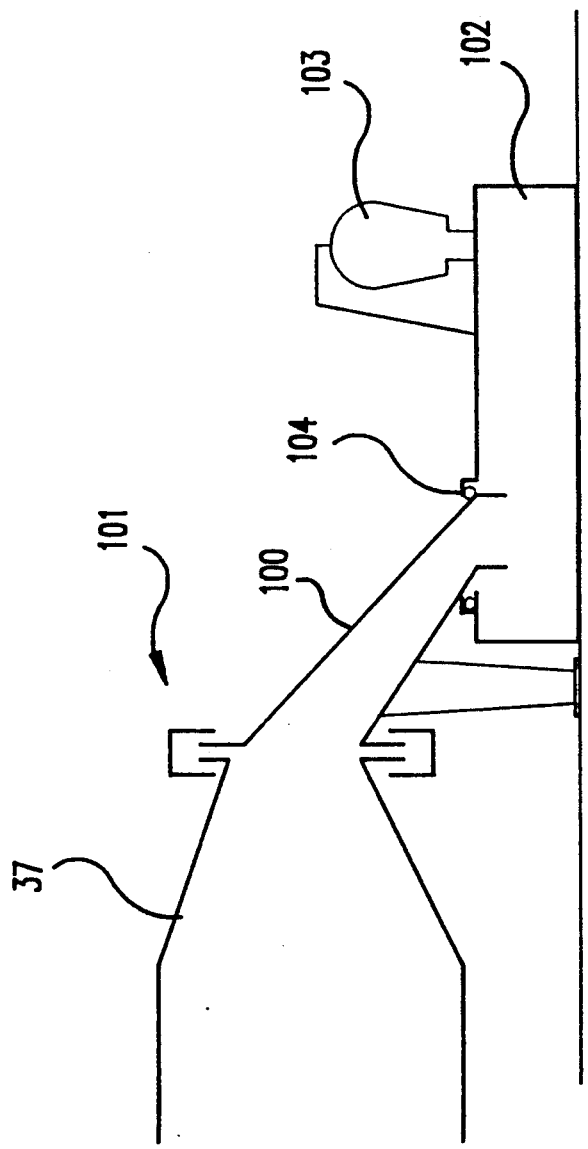

FIG. 9 is a skeleton diagram of one mode of discharging the rotary furnace of FIG. 2.

Figure 1:
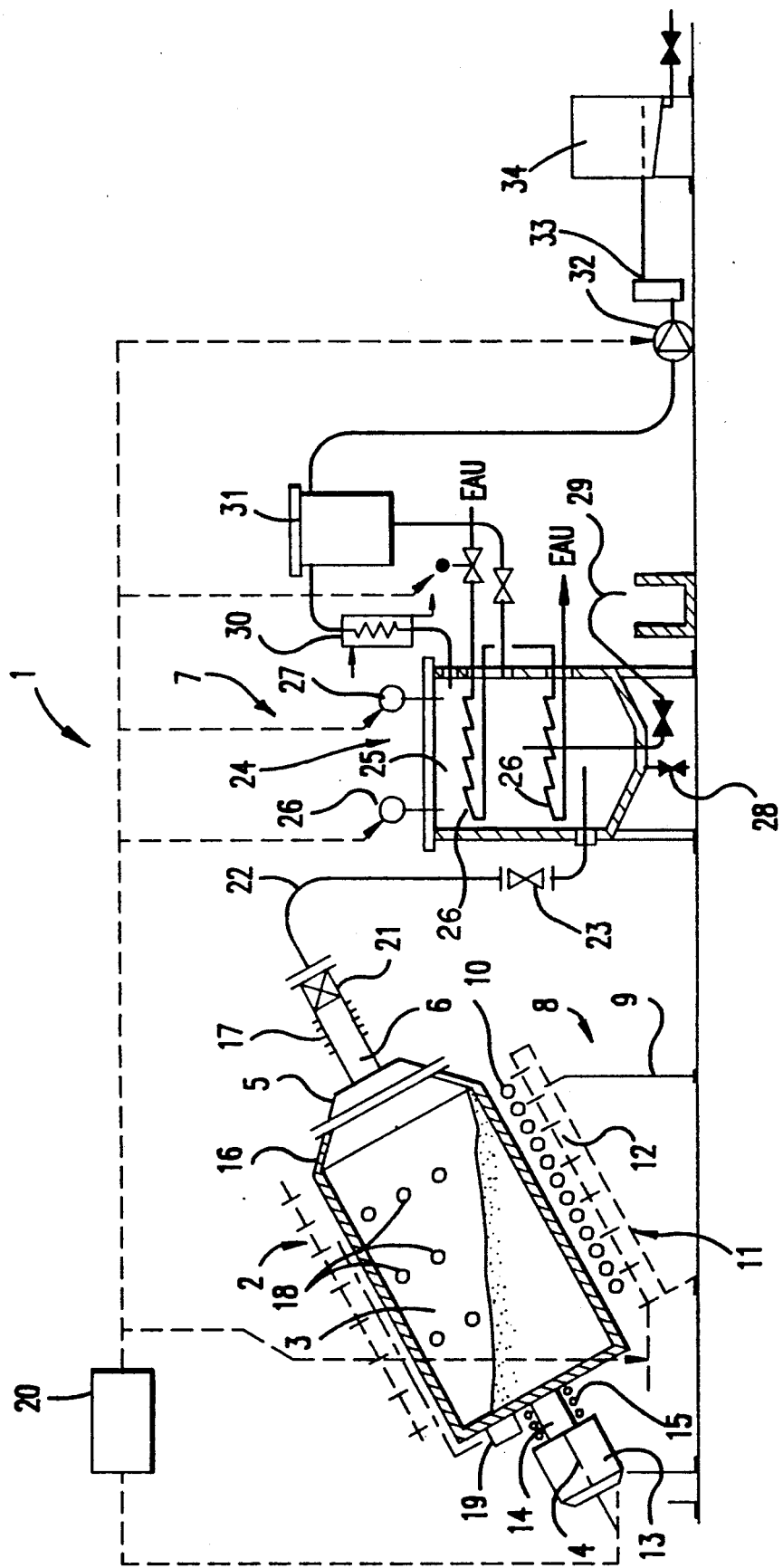
FIG. 1 is a skeleton diagram of one embodiment of the device according to the invention for carrying out the process according to the invention when applied to the decontamination of solid products which are friable or in fragments.

FIG. 1 schematically shows a device 1 according to one embodiment of the invention when applied to the decontamination of a material which is friable or has been crushed beforehand, for example a product consisting of soil contaminated with mercury.

The device 1 has a rotary furnace 2 comprising a cylindrical vessel or enclosure 3 about an axis 4, which may or may not be inclined relative to the horizontal; for example, it can be inclined by an angle of the order of 30°.

The friable or "fragmentary" character of the material or materials to be decontaminated enables a rotary furnace to be used, permitting a good homogenization of the heating in the bulk of the product to be decontaminated.

The enclosure has a detachable cover 5 provided with a neck or tube 6 for evacuating the gases into a gas treatment circuit 7. The cylindrical enclosure 3 rests on the lateral arms 9 of a cradle 8 for supporting the enclosure, for example via bearings 10.

Means 11 are provided for external heating of the enclosure 3 by conduction. They consist for example of one or more electrical heating elements 12. Other means of heating, for example by induction, can of course be used.

A motor 13 is provided for rotating the enclosure 3 about its axis 4 via a shaft 14.

FIG. 1 schematically shows stop means 15 which keep the enclosure 3 in position on its cradle. These stop means are of a design accessible to those skilled in the art and allow the enclosure to rotate freely about its axis 4.

The cover 5 and the upper part 16 of the enclosure are lagged, unlike the neck 6, which serves as a cooler and advantageously comprises fins 17.

The enclosure 3 is provided with uniformly distributed temperature sensors 18 consisting for example of thermocouples.

These thermocouples are connected to a thermostat 19 possessing a high temperature alarm threshold set at 800° C., for example. The thermostat 19 is thermally insulated from the wall of the enclosure to which it is fixed, and is connected to an automatic device 20 which is capable of controlling the heating of the enclosure 3 and which makes it possible to monitor and maintain the temperature at all points on the enclosure, as well as for the extracted vaporized contaminant, always strictly below the above-mentioned high temperature alarm threshold value, in a manner known per se.

The gas treatment circuit 7 is joined to the neck 6 via a rotating joint 21 of a type known per se, for example a rotating joint manufactured by EMCO WHEATON in the UNITED STATES.

The circuit 7 comprises a hose 22 connected at one end, detachably, to the rotating joint 18 and at the other end, via a shutter valve 23, to a scrubber-cooler-condenser 24.

Said condenser 24 comprises a vessel 25 equipped with cooling coils 26 fed with cooling water. Means of monitoring and controlling the pressure in the condenser 24 and hence in the enclosure 3, and the temperature of the condenser, are provided and connected to the automatic device 20.

The condenser 24 has a circuit 28 for discharging the condensed vapor formed by heating the product to be decontaminated, and a circuit 29 for recovering the vaporized contaminant recondensed by the capacitor (sic) 24.

The gas treatment circuit 7 also comprises a second, safety cooler-condenser 30 connected to the gas extraction point downstream of the first condenser 24. It is itself joined to a splash head 31 connected to the suction side of the vacuum pump 32, which extracts the vaporized pollutant from the chamber 3 via the circuit 7.

The vacuum pump 32 is a pump of known type which is capable of creating an acceptable industrial vacuum, for example of up to 0.01 bar absolute, in the enclosure 3. An outlet filter 33 and an absolute filter 34, for example containing active charcoal.

FIG. 2 schematically shows a second embodiment of a device 35 for the decontamination of a product which is friable or in fragments, either initially or after crushing, according to the invention, said device being applicable for example to the decontamination of a soil polluted by PCB.

The device 35 comprises a rotary furnace 36 having an enclosure 37 for holding the friable product 38 to be decontaminated.

The enclosure 37 has a double envelope or shell 39 for heating the product to be decontaminated, which consists of a network of electrical heating elements whose calorific power is controlled by control means 40 known per se, such as, for example, a programmable logic controller (PLC). The heating elements are adjusted so as to heat the enclosure 37 within a given temperature range, for example from about 200° C. to 490° C., without the temperature of the elements and hence that of the whole system and its contents being able "structurally" to exceed 500° C. This is achieved for example by providing means for limiting the electrical power supplied to the elements, and hence the calorific power which said elements can deliver. These means, which are known per se, comprise an adjusting rheostat and means for cutting off the power supply above a threshold value.

The enclosure 37 extends about an axis 37'. A motor 41 is provided which is capable of driving the enclosure at speeds of rotation chosen especially in accordance with the amount of product to be mixed and heated.

The enclosure 37 is supported by a cradle 42.

The device 35 comprises a gas treatment circuit 43 joined to the enclosure 37 via a rotating joint 44 of known type. The rotating joint is connected at one end to the cover 45 of the enclosure 37 and at the other end to a dust filter 46, which is cooled with water in order to allow condensation of the water vapor formed in a first stage by heating the product. The dust filter can be periodically unclogged by rinsing.

The sludges obtained in the filter 46 (water + dust) run into a can 47 for recovering sludges which are not contaminated or only slightly contaminated with pollutant.

The circuit 43 comprises a second condenser 48, which can be isolated from the first condenser 46 by means of a set of valves 49, 49', 50, for example. The condenser 48 is then connected direct to the outlet of the rotary furnace, the filter-condenser 46 being bypassed in order to prevent it from subsequently being contaminated by the vaporized pollutant.

The condensates of vaporized pollutants are collected in a tank 51. A last condenser 52 is advantageously provided and connected downstream of the second condenser 48; a can 53 makes it possible to recover condensates coming from said condenser 52.

A vacuum pump 54, connected to the condenser 52, creates a vacuum in the circuit 43.

The vacuum pump is controlled by the automatic device 40 and delivers into the atmosphere via a filter 55, for example containing active charcoal.

Finally, means (not shown) of sweeping the enclosure with nitrogen are advantageously provided in order to drive out all residual traces of vaporized contaminant.

FIG. 3 shows a condenser/dust separator of the type which can be used in place of the filter-condenser 46 of FIG. 2.

It comprises a can 56 in which a constant level 57 of liquid (water + dust), cooled by coils 58, is maintained.

Pressurized vapor originating from the furnace arrives at 59 through a tube 60 extending below the level 57 of the liquid, the condensation and filtering of the dust-laden vapor thus being effected by bubbling into the liquid. A vacuum-breaking hole 61 is provided in the tube 60. A safety condenser 62, for example consisting of a cooling coil, is installed in the top part of the can 56 in the path of the tube 61 (sic), for example above the vacuum-breaking hole 61.

At the top part, the can 56 is connected to the evacuating circuit by a tube 63.

FIGS. 4 and 5 schematically show two embodiments of that part of the device which is situated in the region of the rotating joint, said embodiments being given by way of non-limiting examples.

When decontamination is complete, the temperature of the furnace is high (for example above 250° C.). Now, the rotating joint fitted to the outlet of the furnace and providing a leaktight link between the enclosure, which is rotating, and the extraction and condensation circuit, which is fixed, does not withstand such temperatures.

It is therefore necessary to cool the connecting tube upstream of the joint. In FIG. 4, the tube 64 is cooled upstream of the joint 65 by fins 66 located at a sufficient distance from the furnace to prevent condensation of the PCB immediately at the outlet of said furnace (the cover 67 being clad with lagging 68).

In fact, part of the soil contained in the enclosure always remains stuck against this outlet during mixing, and this must be prevented from becoming contaminated with the emerging gases, which would be immediately recondensed.

FIG. 5 schematically shows another means of protecting the rotating joint 69 using a cylindrical deflecting shell 70 inside the joint.

Being hot on the gas side, the deflector prevents condensation of the PCB while at the same time insulating the non-lagged rotating joint 69, which is cooled by its surface of exchange with the atmosphere.

FIG. 6 schematically shows a device according to the invention when applied to the decontamination of solid products which are non-friable and have not been crushed beforehand and/or are too large to be decontaminated in a rotary furnace, such as, for example, a transformer contaminated with "pyralene".

The device comprises a furnace 71 having a fixed enclosure 72 capable of containing the product to be decontaminated, said enclosure being equipped with external heating means 73, for example consisting of heating elements 74, and with means 75 of internal heating by the circulation of a gas.

The internal heating means comprise for example a forced draft fan 76, connected to the enclosure 72 in a closed circuit, and heating elements 77 for heating the draft gas circulating in a recycling tube 78. Valves 79 and 80 are provided for isolation and for regulation of the pressure losses in the circuit.

A sensor 81 is provided for detecting the pressure of the enclosure 72.

Sensors 88 for detecting the temperatures of the enclosure 72, for example consisting of thermocouples, are also appropriately installed against the enclosure or in "glove fingers" or probe guide tubes.

These sensors are connected to an automatic device 83 for monitoring and controlling the decontamination device, comprising means known per se for always keeping the temperature of the enclosure strictly below a given value and for permitting control and monitoring of the output of the fan 76 and the calorific power of the heating elements 74 and 77 within a temperature range which does not cause environmentally detrimental degradation of the contaminant.

The device comprises means 84 of extracting the atmosphere from the enclosure 72 and of placing it under a vacuum, said means comprising for example a hose 85 for connecting the enclosure to a condenser 86 equipped with cooling coils 87. The hose 85 is inclined so as to enable the condensates to run into the condenser 86. The condensates 87 are recovered at the bottom of the condenser and discharged through a discharge tube 89.

A "safety" condenser 90, connected to the condenser 86, is connected in series with a vacuum pump 91, for example of the type manufactured by ROOTS, which creates a vacuum in the rest of the device. The vacuum pump delivers into the atmosphere, for example via a filter 92.

A pressure controller 93, connected to the automatic device 83, makes it possible, via the vacuum pump 91, to monitor and control the value of the vacuum in the condenser 86 and hence in the enclosure 72, which is also monitored by the pressure sensor 81.

FIGS. 7 and 8 show an embodiment of the enclosure 72 of a device for the decontamination of a non-friable solid product according to the invention.

The enclosure 72, which consists of a lagged steel parallelepiped, comprises a cover 93, temperature-measuring glove fingers 94 and the various connection pieces for the circulation of the gases, 95, 96, and the extraction of the gases, 97.

The enclosure comprises a detachable perforated "basket" 98 for storing the product to be decontaminated. The basket is mounted for example on wheels 99.

The operation of a device for carrying out the process of the invention, for example when applied to the decontamination of soil polluted by PCB, will now be described with reference to FIG. 2.

After the cover 45 has been opened to provide access to the enclosure 37, the contaminated soil 38 is introduced into the enclosure.

The cover 45 is then closed and the rotary furnace is then connected via the rotating joint 44 to the suction and condensation circuit 43.

The product is then heated and mixed in the rotating furnace to homogenize the temperature.

The vacuum pump 54 creates a slight pressure reduction (for example to 0.9 bar absolute) in the enclosure 37 for a temperature in the region of 90-100° C. (depending on the pressure reduction) and the water contained in the product vaporizes.

The vapor is sucked through the circuit 43 and condenses in the filter 46, which also filters the dusts entrained by the vapor.

Once the vapor has been totally evacuated, the filter 46 is isolated, for example automatically, and the vacuum pump 54 creates the operating vacuum (for example 0.1 bar) in the enclosure 37. The interior of the enclosure therefore contains very little oxygen.

The temperature of the enclosure is then gradually increased by the P.L.C. 40 until it reaches the desired value for heating the product contained in the enclosure, said temperature being within the range which does not cause environmentally detrimental degradation of the contaminant. This temperature is monitored by sensor (not shown) and takes into account the results of calibration of the apparatus.

The PCB vaporizes at a certain temperature; it is sucked, via the filter 46 or via the by-pass circuit passing through the valve 49, into the condensers 48 and 52, where it condenses and drips into the containers 51 and 53, in which it is stored until it is packed or destroyed.

The period for which the product to be decontaminated is heated in the enclosure under vacuum depends on the initial contamination. As a general rule, it is observed that a period of less than 24 hours is sufficient. For example, for an initial contamination of 75,000 ppm, the residual content of PCB in the decontaminated soil has a value of about 1.7 ppm for a treatment period of 24 hours, heating at 215° C.

The decontaminated soil, which is in pulverulent form, is then extracted from the furnace 37. This can be done (see FIG. 9) using a spout 100 which is connected at one end to the enclosure 37 by a leaktight cowling 101 and at the other end to a "box" 102, provided with a filter "collar" 103, by a neoprene-type joint 104.

For operation of the device when applied to the decontamination of a non-friable product of the transformer type contaminated with PCB (see FIG. 6), the heating is effected by convection through the circulation of a gas in the enclosure 72.

The gas used can be an inert gas, for example nitrogen.

Once the desired vaporization temperature has been reached, the gas circulation is stopped. The circuit 75 is isolated by closing the valves 79 and 80.

A vacuum is then created by sucking the atmosphere out of the enclosure via the vacuum pump 91; this permits vaporization of the PCB, which is recondensed in the condenser 93 and then recovered via the tube 89 for storage and destruction.

In the case of the decontamination of aluminum capacitor foil, the paper intercalated between the sheets is "carbonized" at about 240° C. The calcined products are entrained by the sweep air and filtered on a filter (not shown in the Figures). Thus the paper residues are easily removed from the aluminum, which can be recovered.

As an example of particularly advantageous results from decontamination carried out with the process of the invention, it is noted that for a capacitor initially contaminated with 200,000 to 400,000 ppm of PCB, the final PCB content of the aluminum is less than 1 ppm after treatment for 24 hours at 280° C. under a vacuum of 50 mm Hg of absolute pressure.

For a contaminated crushed concrete with an initial mercury content of more than 100,000 ppm, the residual mercury content after 12 hours of treatment at 400° C. under a vacuum of 50 mm Hg of absolute pressure is less than 30 ppm or even less than 5 ppm.

The simplicity of the gas treatment circuit of the devices of the invention represents a considerable advantage of the invention, in particular when this circuit is compared with a conventional gas treatment circuit in the case of incineration. This simplicity is explained by the very low flow rate of extracted gas to be treated, which is virtually zero when using the process and the devices according to the invention.

Finally, three Tables are given below which show examples of experimental result obtained with a process and a device according to the invention.

These Tables illustrate, without in any way implying a limitation, on the one hand the diversity of the products which can be decontaminated with the invention, initially contaminated for example with PCB (Table n° 1) or with mercury (Tables n° 2 and 3), and on the other hand the contamination values which can be obtained for example after carrying out the process of the invention under the operating conditions specified in the Tables.

Table n° 1 shows in particular that the invention is suitable for the decontamination of a product which is initially only slightly contaminated, i.e. contaminated with a proportion of less than about 1000 ppm, or heavily contaminated, i.e. contaminated with a proportion of more than about 100,000 ppm.

Table n° 2 relates to friable soils very highly contaminated with mercury.

Table n° 3 relates to the decontamination of alkaline batteries. In these last two Tables, the principles used to perform the decontamination analyses have also been indicated.

TABLE No 1

| | Decontamination experiments in which different contaminants on different substrates are heated under vacuum | | | | |
|---|---|---|---|---|---|
| Manip. No | Substrate | T° (°C.) | Absolute pressure mm Hg | Heating period (h) | Initial contamination (ppm PCB) | Final contamination (ppm) |
| 1 | parpen (diam. 5 cm) | 300 | 60 | 25 h | ~66,000 | 3.5 |
| 2 | moist red soil | — | 50 | 24 h | 21,754 | 2.2 |
| 3 | transformer wood | 260/280 | 50/55 | 18 h | 400,000 | 23.2 |
| 4 | active charcoal | 300 | 50/55 | 16 h | { PCB:335 TCB:2800 | { 1.3 2.6 |
| 5 | gravel diam. 1 cm | 260° C. (36 h) 290° C. (5 H° (sic) | 50/60 | 41 h | 55,800 | 0.3 |
| 6 | active charcoal | 250 140 105 | | | | |
| 7 | concrete block | 240 | 50 | 23 h | saturated with PCB | 1.8 |
| 8 | pebbles | 310 | 50 | 31 h | 63,570 (dielectric oil) | |
| 9 | copper | 305 | 60 | 36 h | saturated | 0.230 |

TABLE No 1-continued

Decontamination experiments in which different contaminants on different substrates are heated under vacuum

| Manip. No | Substrate | T° (°C.) | Absolute pressure mm Hg | Heating period (h) | Initial contamination (ppm PCB) | Final contamination (ppm) |
|---|---|---|---|---|---|---|
| 10 | sand | 215 | 60 | 24 h | 73,500 | 1.7 |
| 11 | capacitor | 285 | 35 | 67 h | ~450,000 (PCB 1242) | 9 to 11.5 |
| 12 | sand | 300 | 35 | 16 h 30 min + | 73,500 | 0.3 |
| 13 | sheet of paper | 285 | 40 | 22 h + | — | — |
| 14 | sand | 210 | 50 | 26 h + | 73,500 | 43 |
| 15 | sand | 207 | 60/40 | 65 h + | 73,500 | ~2.05 |

TABLE No 2

| SAMPLE REFERENCE | OPERATING PRESSURE mm Hg | OPERATING TEMPERATURE °C. | HEATING PERIOD | INITIAL CONTAMINATION ppm Hg | FINAL CONTAMINATION (Material) ppm Hg | CONTAMINATION OF CONDENSER WATER ppm | OBSERVATIONS |
|---|---|---|---|---|---|---|---|
| A | 50 to 60 | 300 | 3 h | 135,000 to 400,000 (2) | 331 (1) | 1.6 (1) | ANALYTICAL METHODS: |
| B | 60 | 240/255 | 4 h | 135,000 to 400,000 (2) | not analyzed traces of Hg apparent | | (1) Attack of the material with hot concentrated $HNO_3$ Heating until total evaporation Redissolution with moderately concentrated $HNO_3$ Analysis by electronic torch |
| C | 50 | 240/255 | 26 h | 135,00 to 400,000 (2) | 40 (2) 1 (1) | | |
| D | 50 | 320/332 | 21 h | 135,000 to 400,000 (2) | 27 (2) 0.01 (1) | | (2) Attack of the material with hot concentrated $HNO_3$ Cessation of attack of the (sic) reddish brown fumes ($NO_2$) appear Analysis by atomic absorption |
| E | 40 | 225/235 | 16 h | 40,000 + enrichment with liq. Hg | 68 (1) | | |
| F | 50 | 295/325 | 20 h | 100,000 fines plus smaller pebbles | 2 (1) 27 and 30 (3) 13 (2) | | (3) Analysis by neutron activation |
| G | 10 to 15 | 350/390 | 30 h | 100,000 | 25 (2) 60 (3) | | |

TABLE No 3

Decontamination experiment on alkaline batteries

| Sample ref. | Type of battery | Initial contamination (ppm) Hg (4) | Initial contamination (ppm) Hg (5) | Pressure (mm Hg abs.) | T (°C.) | Period (h) | Final contamination (ppm) Hg (4) | Final contamination (ppm) Hg (5) |
|---|---|---|---|---|---|---|---|---|
| 1 | 1.5 V round, dead | 2050 to 2620 | | 40 mm Hg | 390° C. | 24 h | 29 to 37 ppm | 13.6 |
| 2 | 9 V rectangular, dead | 680 to 710 | | 40 mm Hg | 390° C. | 24 h | 11 ppm | 15 |
| 3 | 1.5 V round, dead | | 605 | 40 mm Hg | 490° C. | 24 h | 14 to 17 ppm | 18.8 |
| 4 | 4.5 V rectangular, dead | 1969 to 2094 | | 50 mm Hg | 390° C. | 24 h | 30 to 66 ppm | |

Analytical method
(4) Neutron activation
(5) Atomic absorption

We claim:

1. A discontinuous process for the decontamination of a solid product polluted by at least one contaminant which can be vaporized by heating under vacuum, comprising the steps of:

a) introducing the product into a heating and evacuating enclosure;

b) heating said product, substantially in bulk, within a given temperature range, a vacuum being created in said enclosure which is below about 0.5 bar absolute and sufficient to reduce the pressure of the enclosure below the vaporization threshold of the contaminant within said temperature range;

c) maintaining said temperature and reduced pressure conditions in the enclosure for a sufficient time to vaporize substantially all the contaminant contained in said product;

d) extracting the vaporized contaminant of step c) by sucking the atmosphere out of the enclosure;

e) condensing said contaminant which has been sucked out in step d); and f) sweeping the interior of the enclosure at least once with an inert gas, for a given time, when the vaporized contaminant is extracted, in order to entrain any residual traces of vaporized contaminant stagnating in said enclosure.

2. The process of claim 1, wherein the vacuum created is between 0.5 bar absolute and 0.01 bar absolute.

3. The process of claim 1, wherein the vacuum created is below 0.3 bar absolute.

4. The process of claim 1, wherein the vacuum created is below 0.1 bar absolute.

5. The process of claim 1, wherein the vacuum created is below 0.05 bar absolute.

6. The process of claim 1, wherein the solid product is friable or in fragments and is heated by being mixed in a rotary furnace.

7. The process of claim 1, wherein the water vapor initially contained in the product and formed when said product is heated is extracted through a first circuit, said water vapor being recondensed in a condenser/dust separator until it has been removed, then a vacuum is created in the enclosure and the vaporized contaminant is extracted by sucking the dehydrated atmosphere out of said enclosure through a second circuit, which is isolated from the first circuit.

8. The process of claim 1, wherein the operating vacuum is created in the enclosure before the product is heated within said temperature range.

9. The process of claim 1, wherein the solid product is non-friable and is heated by the circulation of a heating gas in the enclosure.

10. The process of claim 1, wherein the heating as is an inert gas.

11. The process of claim 1, wherein the inert gas of step f) is nitrogen.

12. The process of claim 1, wherein the thermal degradation of the product is hazardous to the environment and the temperature range is adjusted so as to avoid any overheating of the enclosure to a temperature at least equal to the possible thermal degradation threshold of said contaminant.

13. The process of claim 1, wherein the product is heated within a temperature range of from about 200° C. to about 490° C.

14. The process of claim 1, wherein the product is heated within a temperature range is from 270° C. to 330° C.

15. The process of claim 1, wherein the temperature range is adjusted so as to limit the temperature of the vaporized contaminant below a threshold value.

16. The process of claim 15, wherein the product is heated within a temperature range is from 200° C. to 800° C.

17. The process of claim 15, wherein the product is heated to a temperature at about 500° C.

18. The process of claim 1, wherein said temperature and reduced pressure conditions are maintained for a period of between about 5 hours and about 36 hours.

19. The process of claim 1, wherein said temperature and reduced pressure conditions are maintained for a period of about 8 hours.

20. A process for the decontamination of a solid product polluted by small proportions of a contaminant which can be vaporized by heating under vacuum and whose thermal degradation by oxidation is hazardous to the environment, comprising the steps of:

a) introducing the product into a heating and evacuating enclosure;

b) heating the product, substantially in bulk, within a temperature range adjusted so as to avoid any overheating of the enclosure to a temperature at least equal to the possible thermal degradation threshold of said contaminant, a vacuum being created in said enclosure which is below about 0.5 bar absolute and sufficient to reduce the pressure of the enclosure below the vaporization threshold pressure of the contaminant within said temperature range;

c) maintaining said temperature and reduced pressure conditions in the enclosure for a sufficient time to vaporize substantially all the contaminant contained in said product;

d) extracting the vaporized contaminated of step c) by sucking the atmosphere out of the enclosure;

e) condensing said contaminant which has been sucked out in step d); and f) sweeping the interior of the enclosure at least once with an inert gas, for a given time, when the vaporized contaminant is extracted, in order to entrain any residual traces of vaporized contaminant stagnating in said enclosure.

* * * * *